US008276893B2

United States Patent
Martin

(10) Patent No.: US 8,276,893 B2
(45) Date of Patent: Oct. 2, 2012

(54) CARTRIDGE AND ROD END ISOLATOR

(75) Inventor: S. Gregory Martin, Carpentersville, IL (US)

(73) Assignee: SKF USA Inc., Elgin, IL (US)

(*) Notice: Subject to any disclaimer, the term of this patent is extended or adjusted under 35 U.S.C. 154(b) by 0 days.

(21) Appl. No.: 12/818,815

(22) Filed: Jun. 18, 2010

(65) Prior Publication Data

US 2010/0258990 A1    Oct. 14, 2010

Related U.S. Application Data

(63) Continuation of application No. 11/536,772, filed on Sep. 29, 2006, now Pat. No. 7,740,236.

(51) Int. Cl.
    *F16F 7/02*    (2006.01)
(52) U.S. Cl. .............. 267/141.4; 267/293; 384/203; 384/216; 403/226
(58) Field of Classification Search ............. 267/141, 267/141.2, 141.3, 141.4, 141.7, 292, 293; 384/192, 202, 203, 205, 206, 215, 216, 220, 384/222; 403/225, 226, 228
See application file for complete search history.

(56) References Cited

U.S. PATENT DOCUMENTS

| | | | |
|---|---|---|---|
| 2,121,277 A | 6/1938 | Albrecht et al. | |
| 2,283,440 A | 5/1942 | Hufferd | |
| 2,304,595 A | 12/1942 | Prentice | |
| 2,855,232 A | 10/1958 | Kozak | |
| 2,952,901 A * | 9/1960 | King | 29/898.044 |
| 3,115,375 A | 12/1963 | Haller | |
| 3,298,754 A | 1/1967 | Riester | |
| 4,129,394 A | 12/1978 | Eichinger et al. | |
| 5,902,050 A | 5/1999 | Balczun et al. | |
| 7,740,236 B2 * | 6/2010 | Martin | 267/141.5 |
| 2008/0079206 A1 | 4/2008 | Martin | |
| 2008/0136071 A1 | 6/2008 | Weisbeck et al. | |

FOREIGN PATENT DOCUMENTS

| | | | |
|---|---|---|---|
| EP | 0 072 666 A1 * | 2/1983 | |
| SU | 1493807 A * | 7/1989 | |

OTHER PUBLICATIONS

Translation SU 1493807 A1, Kossov et al., Jul. 1989.*

* cited by examiner

*Primary Examiner* — Thomas J Williams
(74) *Attorney, Agent, or Firm* — Vedder Price P.C.

(57) ABSTRACT

An elastomer-containing rod end isolator. The isolator includes a handle for connection to a load and inner and outer members. The outer member is a pocket and the inner member is spherical or nearly so. The pocket and the inner member are concentric and the inner member has two continuous exterior legs extending in a circular path. An elastomer fills most of the space between members.

9 Claims, 2 Drawing Sheets

CARTRIDGE AND ROD END ISOLATOR

CROSS-REFERENCE TO RELATED APPLICATION

This application is a continuation of U.S. patent application Ser. No. 11/536,772, entitled CARTRIDGE AND ROD END ISOLATOR, filed on Sep. 29, 2006, now issued as U.S. Pat. No. 7,740,236 on Jun. 22, 2010 which is hereby incorporated herein in its entirety by reference.

BACKGROUND OF THE INVENTION

The shank 16 and the remainder of the part has a reduced width in relation to the total width of the shoulders 26, defining in part a bore 28 to receive the fastener 30 which extends through and fastens the bracket 33 (only part of the bracket 33 shown in FIG. 2). The inner member 12 very importantly includes a pair of legs 32, 34 or similar formations extending toward the outer spherical surface 38 of the outer member 10, but still spaced from that surface 38.

The basic concept is to utilize the incompressible characteristics of rubber when it is confined, to support large one-time or low cycle load events while still allowing for vibration isolation that is encountered by working loads. The invention also allows for an angular misalignment capability between members. This is accomplished by limiting the ability of rubber to deform elastically under high radial loads and without metal to metal contact of the inner and outer members.

This isolator design enables one to replace this standard elastomer rod with isolators that are of modified form without much or any major changes to the structure. Designs used in other applications, such as engine mounts or gear reduction mounts, have used cylindrical layers of rubber and metal. During high loading conditions, the rubber was essentially removed from the load path by the metal to metal contact on the inner and outer members.

The present invention prevents this metal component to metal component contact, and keeps the isolator in working condition. The cylindrical type of isolator does not allow for angular misalignment, whereas the spherical design does allow for a certain amount of angular misalignment.

One of the novel features of the invention is the provision of legs or dams at both ends of the inner member, which, in combination with the mold fingers or cutaway portion of rubber, allows the rubber to take on a unique shape. According to this unique shape, the rubber just then fills up the gap between the leg and the outer member, thus rendering it incompressible under high loading conditions, whereby there is no metal to metal contact. Yet, the arrangement does allow for misalignment of the parts to a certain extent, and of course allows vibration to be isolated over the working load range.

For example, one use of this design is for overhead stowage bin isolator mounts on passenger aircraft. The isolator is comprised of three components, an inner member, an outer member and an elastomeric element. The elastomer is bonded to both of these members and lies between the two of them. The exterior of the outer member is customarily cylindrical or banjo (rod end) in form.

The inner member uses a mounting bracket and a fastener extending there-through of generally rigid construction. The outer member carries the load and is able to isolate vibration with no difficulty. The novel features of the invention include the mold fingers which provide a space for the rubber to be compressed when subjected to load, and this rubber is confined in part by the two legs or the like, which are prevented from contacting the adjacent metal by reason of the legs' compression of the rubber into the previously unoccupied space. Accordingly, metal to metal contact is prevented, which would be damaging to the parts.

When in use, in one example, the isolator is able to support large, low-cycle loading events and greatly reduces the structure-borne noise in aircraft overhead stowage bins. These stowage bins, if mounted using standard metallic rod end bearings, would amplify the noise and vibration which is transmitted to them through their support structure. However, using the isolators of the present invention, they are able to take a certain amount of misalignment and, when loaded heavily, still not be deformed enough to render them ineffective.

Accordingly, it is an object of the present invention to provide an improved cartridge and rod end elastomeric isolator.

Another object is to provide a rod end isolator having a spherical or near spherical joint made from elastomer which is molded in-place between two specially made metal components.

Another object is to provide an isolator having a spherical portion with one leg or the like on each end of the inner member, with the legs being relatively thin and extending radially outward toward the outer member, but with a space in between the inner and outer members.

Another object of the invention is to provide a rod end isolator with a spherical segment made from rubber, but having on each end of the rubber a void created by a mold finger or the like for leaving this area free for engagement by the inner member legs.

Another object is to provide an inner member with such legs on its outer sides and having a cylindrical bore of increased length whereby to allow for twisting or other movement by the outer member.

Another object is to provide a rod end isolator which includes an outer diameter surrounding member, an inner member of increased width, with the two members having a bonded, relatively thin layer of elastomer separating them.

SUMMARY OF THE INVENTION

These and other objects of the present invention are accomplished by providing a rod end portion having an inner member, an outer member, and a layer of rubber between the inner and outer members, with the inner member having a cylindrical bore therethrough and having a pair of radially extending, narrow legs or walls at the end portion of the outer diameter of the inner member, and including a volume void of rubber but which will be filled upon application of a strong force to the rubber.

The manner in which these and other objects of the invention, and the manner of their attainment, will become more clearly apparent when reference is made to the following detailed description of the invention set forth by way of example and shown in the accompanying drawings, in which like reference numbers indicate corresponding parts throughout.

DESCRIPTION OF THE PREFERRED EMBODIMENTS OF THE INVENTION

While the invention is capable of several modifications and changes without departing from the spirit of the invention or the scope of the claims, a preferred form of isolator will now be described.

Figure 2:
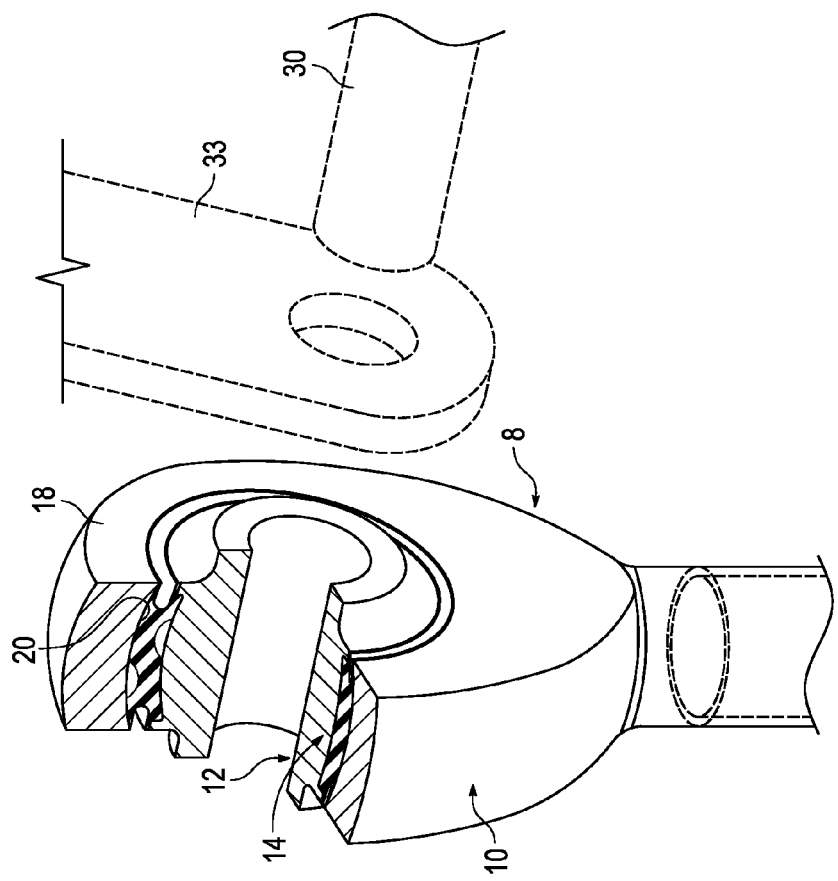
FIG. 2 is a perspective view, with portions broken away, showing the rubber and the surfaces to which the rubber is bonded, and showing a fastener and a bracket in phantom lines and showing the remainder of the inventive isolator.
Figure 1:
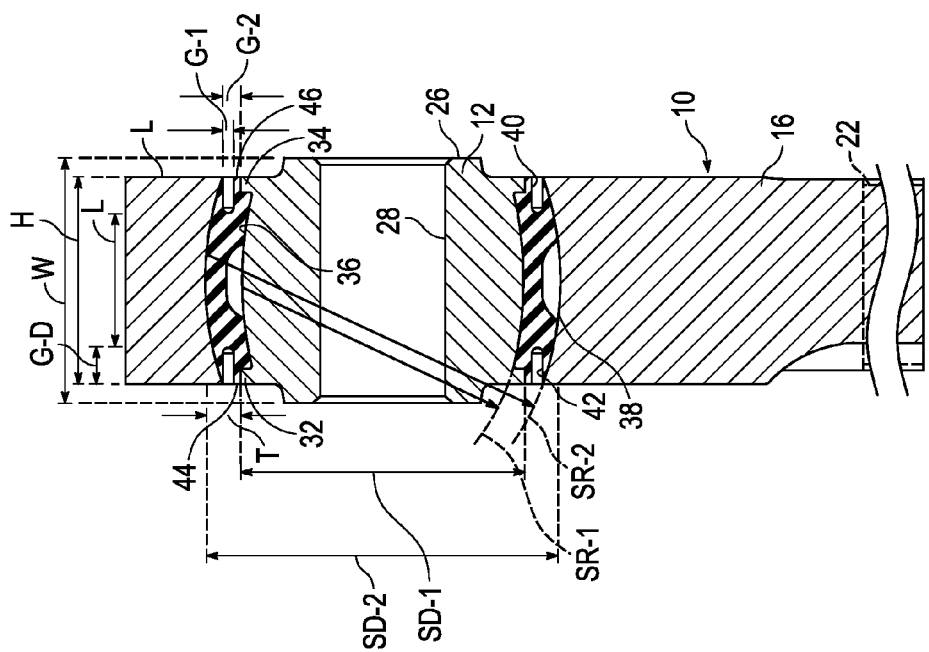
FIG. 1 is a vertical sectional view of the rod end isolator of the invention, showing the outer portion, the inner portion, with a space between them being filled with a layer of rubber, and showing a pair of legs or the like extending out toward but not touching the outer member, and the mold void space lying radially outward of the leg portions.
Figure 3:
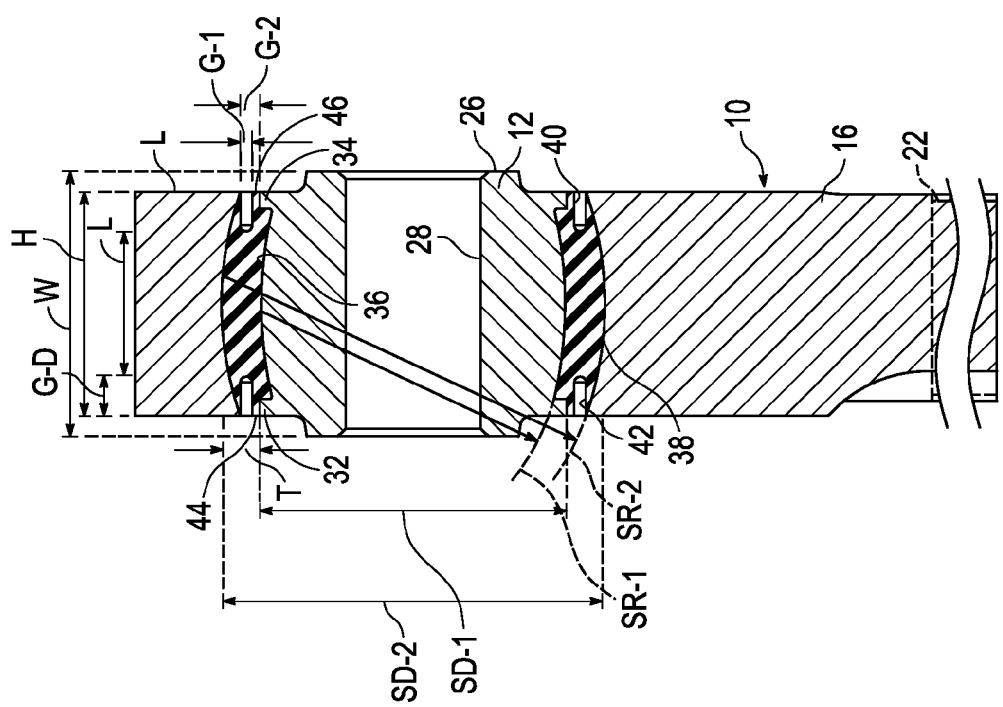
FIG. 3 is a vertical sectional view of the rod end isolator, showing the outer member, the inner member, and a layer of an elastomer lying between and strongly adhered to both the inner member and the outer member, and occupying the entire space between the members except for the volume on each side taken up by mold fingers, where the volume of the mold fingers extends from outside each of the members to points inside the lateral extent of the legs.

Referring now to the drawings in greater detail, FIGS. 1 and 2 show the composite rod end isolator 8 to include an outer diameter portion generally designated 10, a radially inner member generally designated 12 and a rubber or other elastomeric layer generally designated 14. The outer member or outside diameter part usually has a shank or the like with at least a portion thereof 16 threaded as at 22 for receiving a threaded rod, a cable, or the like. This is, the outer member or outside diameter part includes a means for connection to a load such as threaded portion 22 of shank, or the like, 16. The outer diameter part 10 includes a head portion 18, and a hollowed out portion 20 in the form of a truncated sphere for receiving the compound spherical inner member 12.

The shank 16 and the remainder of the part has a reduced width 24 in relation to the total width of the shoulders 26, defining in part a bore 28 to receive the fastener 30 which extends through and fastens the bracket 33 (only part of the bracket 33 shown in FIG. 2). The inner member 12 very importantly includes a pair of legs 32, 34 or similar formations extending toward the outer spherical surface 20 of the outer member 10, but still spaced from that surface 20.

The other or inner spherical surface 36 is spaced apart from the outer spherical surface 20 by the thickness of the rubber layer 14.

Referring again to the drawings, there are openings 40, 42 created as a result of molding called "mold fingers" that keep rubber out of this volume during molding, and these openings form a groove which extends circumferentially on both sides of the rubber 14 and these grooves lie between the radially outer end portions of the legs 32, 34 and the surface 20. There is a small amount of rubber 44, 46 just radially outboard of the legs 32, 34. These openings from the mold fingers 40, 42, however, extend axially deeper and well beyond the total width of each leg 32, 34.

Referring again to the drawings, the overall width of the inner member 12 is shown at W in FIG. 1. The narrower width H is slightly reduced and shows the width of the outer member 10. The depth created by the mold fingers is shown at G-D, and is symmetrical; in other words, there is a G-D on both sides of the height H. The next dimension L is the full width of the rubber, and it has a thickness of T, in other words, the distance between the surfaces 20, 36.

The diameter of the mold fingers or the air gap width is shown at G-1, and the total width of the mold fingers plus the residual rubber just radially outboard of the legs 32, 34, is G-2. In other words, the total gap width between metal components is G-2. The diameter of the inner, spherical compound surface is SD-1 and the outer spherical compound surface diameter is SD-2. The spherical radius of the inner member is SR-1, and the spherical radius of the outer member is SR-2.

Referring now to the manner in which this isolator is used, one application is serving to mount an overhead stowage bin on a fixed wing aircraft. The inner member 12 of the isolator 8 is affixed to the aircraft by the fasteners 30 which engages the bracket 33. A rod 22 extends from the outer member and to the lower end of the movable bin which holds the possessions of the aircraft's passengers.

This application is one which isolates the vibration and provides for a certain amount of misalignment or angular allowance for this application. By using this design, rubber can perform elastically under low or high radial load without metal-to-metal contact of the inner members. A cylindrical application would not allow for the twisting or angular misalignment, but the spherical arrangement does. The rubber element is designed to fill in the volume or close the gap in the direction of radial loading between the legs. This prevents pinching of the elastomer layer in the deformed state under high loading conditions.

The inner and outer portions have a spherical curvature, although not necessarily one which would allow the inner and outer members to be parts of the same or of concentric spheres. Of course, the high frequency vibration is damped out and isolated by the rubber mounting. The cumulative reduction of structure borne noise in all aircraft storage bin is very greatly reduced, and flexibility of alignment is provided by the arrangement of the inner member and the outer member.

This design limits functions by the volume of space or the volume of the groove into which the rubber can elastically deform. This significantly increases the pressure in the rubber element when it is placed under high radial load. This is because the incompressible nature of rubber when confined increases the spring rate, allowing large loads to be applied while avoiding any metal-to-metal contact of the inner and outer members. With working loads, where the radial load is greatly reduced, the spring rate is significantly lower and this allows for vibration attenuation.

The key feature in the design is sizing the elastomeric element gap geometry for the required load and deflection conditions. The amount of deflection needed for normal working loads determines the gap width (G1), rubber layer thickness (T), and rubber layer length (L). Higher loading conditions, such as limit loads and ultimate loads, also contribute to determining the gap width (G1) and rubber layer length (L), but primarily the size, the width, and depth of the "Legs" are determined by sizing the total gap width (G2) and gap depth (GD).

The inner member and outer member compound spherical surfaces (SD1, SD2, SR1, SR2) allow for angular misalignment while maximizing radial load capability. Their heights (W, H) and diameters (ID, OD) are dependant on the geometric envelope requirements of the specific application, but also directly contribute to loading capacity and vibration attenuation capabilities of each isolator by limiting the possible size of the rubber layer thickness (T) and length (L).

The outer member can be of different forms, dependent on the geometric envelope and mounting requirements of specific applications.

It will thus be seen that the present invention provides a novel elastomeric rod end isolator having a number of advantages and characteristics, including those pointed out and others which are inherent in the invention.

What is claimed is:

1. An isolator comprising: an outer member including an axial outer periphery defining an opening disposed about a central axis and a pocket defined in a radial interior surface of the outer member that extends from the outer periphery through the outer member, wherein the pocket includes a major section that is non-parallel to the central axis; an inner member disposed substantially concentric within stud outer member, the inner member including an axial outer face defining an aperture disposed about the central axis and a radial outer surface that extends across the inner member, wherein the outer surface includes a first portion disposed contiguous with and extending from the outer face that is parallel to the central axis and a second portion disposed contiguous with and extending from the first portion that is non-parallel to the central axis: and an elastomeric isolator disposed between said inner and outer members and substantially occupying a space defined between said inner and outer members, the elastomeric isolator including an axially inwardly extending groove defined by is first groove wall and a second groove wall, said first groove wail separated from said second groove wall by a gap width, wherein the groove extends circumferentially about a periphery of the elastomeric isolator and wherein a groove depth defined by an axial extent of said first groove wall and said second groove wall is greater than the gap width and said first groove wall and said second groove wall are parallel to the central axis.

2. The isolator as recited in claim 1, wherein the major section and the second portion are configured substantially complimentary.

3. The isolator as recited in claim 1, wherein the groove depth is at least one and one-half times the gap width.

4. An elastomeric isolator comprising a unitary body of an elastomer material and an outer member, said. unitary body bonded to said outer member, said unitary body having a radial load-carrying portion and an angular misalignment portion, wherein the angular misalignment portion includes an axially inwardly extending groove defined by a first groove wall and a second groove wall, said first groove wall separated from said second groove wall by a gap width, wherein the groove extends circumferentially about a periphery of the elastomer isolator and, wherein a groove depth defined by an extent of said first groove wall and said second groove wall is greater than the gap width and an outer wall of the radial load carrying portion is non-parallel to the first groove wall.

5. The elastomeric isolator as recited in claim 4, wherein an inner wall of the radial load-carrying portion is non-parallel to the first groove wall.

6. The elastomeric isolator as recited in claim 4, wherein the groove depth is at least one and one-half times the gap width.

7. An elastic isolator comprising a unitary body of an elastomer material, said unitary body having an angular misalignment portion, wherein the angular misalignment portion includes an axially inwardly extending groove defined by a first groove wall and a second groove wall, said first groove wall separated from said second groove wall by a gap width, wherein the groove extends circumferentially about a periphery of the elastomeric isolator and a groove depth is at least one and one half times the gap width; and a radially inner surface having a first end portion, a second end portion, and a transition portion, wherein the first end portion and the second end portion are positioned at axially opposite ends or said radially inner surface and are oriented parallel to said axially inwardly extending groove and are connected by said transition portion, said transition portion oriented non-parallel to said axially inwardly extending groove.

8. The elastomeric isolator of claim 7, wherein said transition portion is non-parallel to both said first end portion and said second end portion.

9. The elastomeric isolator of claim 7, wherein said unitary body further includes a radially outer surface wherein said radially outer surface is substantially parallel to said radially inner surface.

* * * * *